United States Patent Office 3,814,756
Patented June 4, 1974

3,814,756
DERIVATIVES OF 1,2-DIHYDRO-2-OXO-4-AMINO-PYRIMIDO[4,5-b]QUINOXALINE - 5,10-MICRON-DIOXIDES
Florin Seng, Cologne, Kurt Ley, Odenthal-Globusch, and Karl Georg Metzger, Wuppertal-Elberfeld, Germany, assignors to Bayer Aktiengesellschaft, Leverkusen, Germany
No Drawing. Filed May 2, 1972, Ser. No. 249,702
Claims priority, application Germany, May 7, 1971, P 21 22 571.8
Int. Cl. C07d 51/46
U.S. Cl. 260—247.2 A      10 Claims

ABSTRACT OF THE DISCLOSURE 1,2-dihydro-2-oxo-4-aminopyrimido[4,5-b]quinoxaline-5,10-dioxides demonstrate antimicrobial activity and can be used as such or in compositions for combatting infections and in improving feed efficiency. The compounds, of which 1,2-dihydro-2-oxo-4-dimethylaminopyrimido[4,5-b]quinoxaline-5,10-dioxide is a typical embodiment, are prepared from the appropriate 3-aminoquinoxaline-1,4-dioxide-2-amidine and phosgene or an alkyl chloroformate followed by treatment with base.

---

The present invention pertains to 1,2-dihydro-2-oxo-4-aminopyrimido[4,5-b]quinoxaline-5,10-dioxides, to methods for the preparation and use of these compounds, and to compositions adapted to the utilization of their antimicrobial properties. In particular, this invention is directed at a compound selected from the group consisting of a 1,2-dihydro-2-oxo-4-aminopyrimido[4,5-b]quinoxaline-5,10-dioxide of the formula:

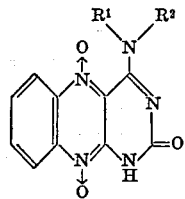

wherein each of $R^1$ and $R^2$ independent of the other is lower alkyl or (lower alkoxy)lower alkyl or $R^1$ and $R^2$ together with the nitrogen atom to which they are attached are pyrrolidino, piperidino, hexamethyleneimino or morpholino; and a pharmaceutically acceptable acid addition salt thereof.

The term alkyl denotes a univalent saturated branched or straight hydrocarbon chain containing from 1 to 18 carbon atoms. Representative of such alkyl groups are thus methyl, ethyl, propyl, isopropyl, butyl, isobutyl, sec.butyl, tert.butyl, pentyl, isopentyl, neopentyl, tert. pentyl, hexyl, isohexyl, heptyl, octyl, nonyl, decyl, undecyl, dodecyl, tridecyl, tetradecyl, pentadecyl, hexadecyl, heptadecyl, octadecyl, and the like.

The term lower alkyl denotes a univalent saturated branched or straight hydrocarbon chain containing from 1 to 6 carbon atoms. Representative of such lower alkyl groups are thus methyl, ethyl, propyl, isopropyl, butyl, isobutyl, sec.butyl, tert.butyl, pentyl, isopentyl, neopentyl, tert.pentyl, hexyl, and the like.

The term lower alkoxy denotes a straight or branched hydrocarbon chain bound to the remainder of the molecule through an ethereal oxygen atom as, for example, methoxy, ethoxy, propoxy, isopropoxy, butoxy, isobutoxy, pentoxy and hexoxy.

As indicated, the present invention also pertains to the physiologically acceptable non-toxic acid addition salts of these basic compounds. Such salts include those derived from organic and inorganic acids such as, without limitation, hydrochloric acid, hydrobromic acid, phosphoric acid, sulfuric acid, methane sulphonic acid, acetic acid, tartaric acid, lactic acid, succinic acid, citric acid, malic acid, maleic acid, sorbic acid, aconitic acid, salicylic acid, phthalic acid, embonic acid, enanthic acid, and the like.

The present invention also pertains to the novel process utilized in the preparation of the compounds of Formula I. In particular, the 1,2-dihydro-2-oxo-4-aminopyrimido[4,5-b]quinoxalines of Formula I are obtained through treatment of an amidine of the formula:

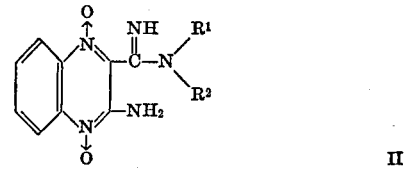

wherein $R^1$ and $R^2$ are as herein defined with phosgene or lower alkyl chloroformate and treating the product thereby formed with an organic or inorganic base.

The initial reaction between the amidines of the Formula II and the alkyl chloroformate or phosgene is carried out at temperatures of between about 20°C. and about 100° C., preferably about 60° C. to about 80° C., at normal or elevated pressure, generally normal pressure. At least about 1 mol of phosgene or alkyl chloroformate is employed per mol of amidine and preferably 1 to 10 mols of phosgene or 1 to 2 mols of alkyl chloroformate. Suitable diluents for the reaction include all inert organic solvents, preferably non-polar ones such as, for example, aliphatic and aromatic hydrocarbons, such as petrol, benzene and toluene, and halogenated hydrocarbons, such as chlorobenzene or dichlorobenzene.

The amidine of Formula II or its salt, preferably its hydrohalide, especially its hydrochloride, is thus suspended in a diluent and either phosgene is introduced into the suspension, or chloroformate acid alkyl ester is added, An intermediate product, which can be if desired isolated, is thus formed which can be diagrammatically depicted as follows:

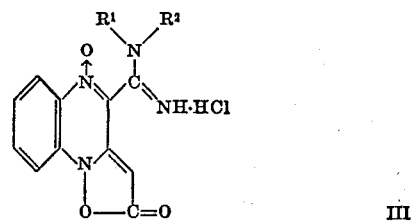

in which $R^1$ and $R^2$ are as defined above. Under the action of an organic or inorganic base, the intermediate of Formula III is converted into the compound of Formula I. The intermediate of Formula III can be either isolated as for example by filtration, before being reacted with a base, or reacted directly with a base without isolation. Suitable organic bases include primary, secondary and tertiary amines, such as aliphatic, cycloaliphatic, aromatic, araliphatic, primary, secondary and tertiary amines such as methylamine, dimethylamine, triethylamine, piperidine, pyridine, and the like. Inorganic bases include alkali metal hydroxides and alkaline earth metal hydroxides, alkali metal carbonates and alkaline earth metal carbonates, and alkali metal bicarbonates and alkaline earth bicarbonates: such as sodium, potassium or calcium hydroxides, sodium or potassium carbonate, sodium or potassium bicarbonate, and the like. If the intermediate is isolated before treatment with a base, it is preferably first dissolved in water, a polar organic solvent or a mixture thereof, preferably a lower alkanol as for example methanol, ethanol, n- and iso-propanol, n-, iso- and tert.- butanol and about 1 mol of the base is then added.

If the intermediate is treated with base without isolation, it is advisable to first remove any excess phosgene which may still be present in the reaction mixture. This can be accomplished for example simply by warming or aeration. The mixture is then treated with water or a polar organic solvent, preferably about the same amount of water as organic solvent and about 1 mol of the base is added per mol of the amidine originally employed.

In either case, the treatment of the intermediate with the base is carried out at temperatures of from about −10° C. to about 50° C., preferably 20° C. to 30° C. The product is isolated by any suitable method, for example by filtration.

The amidines of Formula II can be obtained in any suitable manner, for example by reaction of 2-amino-3-cyanoquinoxaline-di-N-oxide with a secondary amine in the presence of an inert organic solvent at 30° C. to 100° C.; see, e.g., British Patent Specification No. 1,170,387.

These products, both the free bases and their salts, display antibacterial activity against a variety of Gram positive and Gram negative bacteria such as *Enterobacteriaceae*, for example *Escherichiae*, especially *Escherichia coli*; *Proteae* as for example *Proteus vulgaris*, *Proteus mirabilis*, *Proteus morganii* and *Proteus rettgeri*; *Klebsiella* as for example *Klebsiella pneumoniae*; *Salmonelleae*; *Pseudomonodaceae* as for example *Pseudomonas aeruginosa*; *Cocci*, especially *Staphylococci*, such as for example *Staphylococcus aureus*; *Streptococci* as for example *Streptococcus pyogenes*; *Enterococci* as for example *Streptococcus faecalis*; and *Mycoplasma* as for example *Mycoplasma pneumoniae* and *Mycoplasma hominis*. As a result of this activity and their low toxicity, the compounds are useful in human and veterinary medicine in the treatment of infections in animals caused by Gram positive and Gram negative bacteria and by mycoplasma. Infections of the respiratory tracts in poultry, especially in chicks, and mastitis of cows can be mentioned as particularly responsive to such treatment.

The method of treatment of microbial infections in animals according to this invention comprises the administration to the animal of an antimicrobially effective amount of a 1,2-dihydro-2-oxo-4-aminopyrimido[4,5-b]quinoxaline of Formula I, or a salt thereof. The amount administered will of course depend upon the nature and severity of the infection, whether the treatment is curative or prophylactic, the age and condition of the recipient of the treatment and the method of administration and dosage regimen. Generally, however, a suitable response is observed with doses of from 5 to 200 mg./kg. of body weight. This of course must be adjusted to the individual case, utilizing sound professional judgement and careful observation of the response obtained.

As representative of the spectrum of antimicrobial activity for these compounds, the following minimum inhibitory concentrations may be noted:

The compounds of the present invention are administered parenterally or orally in any of the usual pharmaceutical forms. These include solid and liquid oral unit dosage forms such as tablets, capsules, powders, suspensions, solutions, syrups and the like, including sustained release preparations, and fluid injectable forms such as sterile solutions and suspensions. The term unit dosage form as used in this specification and the claims refer to physically discrete units to be administered in single or multiple dosage to animals, each unit containing a predetermined quantity of active material in association with the required diluent, carrier or vehicle. The quantity of active material is that calculated to produce the desired therapeutic effect upon administration of one or more of such units.

Powders are prepared by comminuting the compound to a suitable fine size and mixing with a similarly comminuted diluent pharmaceutical carrier such as an edible carbohydrate material as for example, starch. Sweetening, flavoring, preservative, dispersing and coloring agents can also be present.

Capsules are made by preparing a powder mixture as described above and filling formed gelatin sheaths. A lubricant such as talc, magnesium stearate and calcium stearate can be added to the powder mixture as an adjuvant before the filling operation; a glidant such as colloidal silica may be added to improve flow properties; a disintegrating or solubilizing agent may be added to improve the availability of the medicament when the capsule is ingested.

Tablets are made by preparing a powder mixture, granulating or slugging, adding a lubricant and disintegrant and pressing into tablets. A powder mixture is prepared by mixing the compound, suitably comminuted, with a diluent or base such as starch, sucrose, kaolin, dicalcium phosphate and the like. The powder mixture can be granulated by wetting with a binder such as syrup, starch paste, acacia mucilage or solutions of cellulosic or polymeric materials and forcing through a screen. As an alternative to granulating, the powder mixture can be run through the tablet machine and the resulting imperfectly formed slugs broken into granules. The granules can be lubricated to prevent sticking to the tablet forming dies by means of the addition of stearic acid, a stearate salt, talc or mineral oil. The lubricated mixture is then compressed into tablets. The medicaments can also be combined with free flowing inert carriers and compressed into tablets directly without going through the granulating or slugging steps. A protective coating consisting of a sealing coat of shellac, a coating of sugar or polymeric material and a polish coating of wax can be provided. Dyestuffs can be added to these coatings to distinguish different unit dosages.

Oral fluids such as syrups and elixirs can be prepared in unit dosage form so that a given quantity, e.g., a teaspoonful, contains a predetermined amount of the compound. Syrups can be prepared by dissolving the compound in a suitably flavored aqueous sucrose solution while elixirs are prepared through the use of a non-toxic alcoholic vehicle. Suspensions can be formulated by dis-

MINIMUM INHIBITORY CONCENTRATION (MIC) IN γ/ML. NUTRIENT MEDIUM

| Compound from Example number | Streptococcus pyogenes W | Staphylococcus aureus Flensungen | Escherichia coli | | Pseudomomas aeruginosa | | Proteus vulgaris | Klebsiella | | Aeromonas liquefaciens |
|---|---|---|---|---|---|---|---|---|---|---|
| | | | N 14 | A 261 | Bonn | N 1 | | K10 | 8085 | |
| 1 | 0.6 | 2.5 | 1.25 | 2.5 | 100 | 100 | 1.25 | 10 | 5 | 1 |
| 2 | 1.25 | 1.25 | 5 | 10 | | 100 | 2.5 | 10 | 2.5 | 1 |
| 5 | 10 | 15 | 100 | 100 | | | 100 | 100 | 100 | 10 |
| 6 | 10 | 5 | 10 | | | | 100 | 15 | 15 | 1 |

| Compound from Example number | Clostridium tetani | Clostridium botulinum | Alkaligenes faecalis | Pasteurella multocida | Bordetella bronchiseptica | Mycoplasmae gallisepticum MS | Mycoplasmae bovirhine S 6 | Mycoplasmae granularum |
|---|---|---|---|---|---|---|---|---|
| 1 | 100 | 0.1 | 1 | 1 | 10 | 10 | 10 | <0.1 |
| 2 | <0.1 | 1 | 100 | <0.1 | 10 | 1 | 10 | <0.1 |
| 5 | 100 | 10 | 100 | 10 | 100 | 100 | 100 | 10 |
| 6 | 100 | <0.1 | 1 | 1 | 10 | 10 | 10 | <0.1 | persing the compound in a non-toxic vehicle in which it is insoluble.

Fluid unit dosage forms for parenteral administration can be prepared by suspending or dissolving a measured amount of the compound in a non-toxic liquid vehicle suitable for injection such as an aqueous or oleaginous medium and sterilizing the suspension or solution. Alternatively a measured amount of the compound is placed in a vial and the vial and its contents are sterilized and sealed. An accompanying vial or vehicle can be provided for mixing prior to administration.

In addition to their therapeutic use, the new compounds can also be used to promote the growth and improve feed utilization in animals, especially in raising young animals and fat-stock animals, as for example, calves, piglets and chicks.

The compounds can be administered in the feedstuff, in special feedstuff preparations, in preparations containing vitamins and/or mineral salts, or in the drinking water. Such administration of the compounds permits prevention or treatment of infections caused by Gram negative and by Gram positive bacteria and by mycoplasma, and additionally contributes to a more rapid growth of the animals and to better feed efficiency. In this embodiment, the compounds are preferably mixed into the feedstuff or the drinking water in a concentration of 1 to 100 p.p.m.

The following examples will serve to further typify the nature of the present invention without being a limitation on the scope thereof:

EXAMPLE 1

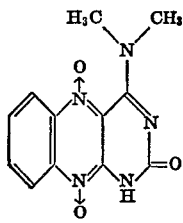

24.7 g. (0.1 mol) of 3-aminoquinoxaline-1,4-dioxide-2-dimethylamidine (Formula II, $R^1$, $R^2$=methyl) are suspended in 125 ml. of benzene and treated with gaseous hydrogen chloride until saturation is reached. Thereafter phosgene is passed into the suspension at 80° C. for 2 hours. The resulting yellow intermediate product is filtered off, suspended in 150 ml. of ethanol and treated with 10 g. of triethylamine. This results in a red-violet solution, from which red crystals of 1,2-dihydro-2-oxo-4-dimethylaminopyrimido[4,5 - b]quinoxaline-5,10-dioxide separate after some time. Yield: 26 g. (95%), melting point: 227° C.

Analysis.—$C_{12}H_{11}N_5O_3$ (273): Calculated: C, 52.7%; H, 4.0%; N, 25.3%. Found: C, 52.4%; H, 4.5%; N, 25.0%.

EXAMPLE 2

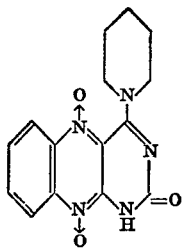

14.3 g. (0.05 mol) of 2-piperidinocarbimido-3-aminoquinoxaline-1,4-dioxide in 150 ml. of chlorobenzene, are stirred with 6.5 g. of chloroformic acid methyl ester for 8 hours at 80° C. Thereafter the resulting intermediate product is filtered off and dissolved in dilute sodium hydroxide solution. On acidification with acetic acid, 9 g. (58% of theory) of 1,2-dihydro-2-oxo-4-piperidino-pyrimido[4,5-b]quinoxaline-5,10-dioxide are obtained as red crystals which after boiling with alcohol melt at 264° C.

Analysis.—$C_{15}H_{15}N_5O_3$ (313): Calculated: C, 57.5%; H, 4.8%; N, 22.3%. Found: C, 57.5%; H, 5.2%; N, 22.1%.

Similar results are obtained through the use of an equivalent amount of ethyl chloroformate.

EXAMPLES 3–6

Utilizing equivalent amounts of 3-aminoquinoxaline-1,4-dioxide-2-diethylamidine; 2 - pyrrolidinocarbimido-3-aminoquinoxaline-1,4-dioxide; 2-morpholinocarbimido-3-aminoquinoxaline-1,4-dioxide and 2-hexamethyleneimino-carbimido-3-aminoquinoxaline-1,4-dioxide, respectively, the following compounds are obtained:

Formula I

| Example number | $R^1$ / N \ $R^2$ | Color | M.P., degree | Yield, percent |
|---|---|---|---|---|
| 3 | N(C₂H₅)(C₂H₅) | Red-brown | ¹188–89 | 83 |
| 4 | pyrrolidino | do | ¹188 | 68 |
| 5 | morpholino | do | ¹193–95 | 71 |
| 6 | piperidino | Red | 184–85 | 79 |

¹ Decomposition.

What is claimed is:

1. A compound selected from the group consisting of a 1,2-dihydro-2-oxo-4-aminopyrimido[4,5-b]quinoxaline-5,10-dioxide of the formula:

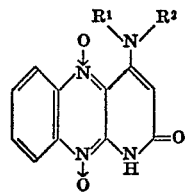

wherein each of $R^1$ and $R^2$ independent of the other is lower alkyl of 1 to 6 carbon atoms or (lower alkoxy) lower alkyl in which "lower alkyl" contains 1 to 6 carbon atoms and "lower alkoxy" contains 1 to 6 carbon atoms or $R^1$ and $R^2$ together with the nitrogen atom to which they are attached are pyrrolidino, piperidino, hexamethyleneimino or morpholino; and a pharmaceutically acceptable acid addition salt thereof.

2. A compoupnd according to claim 1 wherein $R^1$ and $R^2$ are each lower alkyl.

3. A compound according to claim 1 wherein $R^1$ and $R^2$ together with the nitrogen atom to which they are attached are pyrrolidino, piperidino, hexamethyleneimino or morpholino.

4. The compound according to claim 1 which is 1,2-dihydro-2-oxo-4-dimethylaminopyrimido[4,5-b] quinoxaline-5,10-dioxide.

5. The compound according to claim 1 which is 1,2-dihydro-2-oxo - 4 - diethylaminopyrimido[4,5-b]quinoxaline-5,10-dioxide.

6. The compound according to claim 1 which is 1,2-dihydro - 2 - oxo-4-piperidinopyrimido[4,5-b]quinoxaline-5,10-dioxide.

7. The compound according to claim 1 which is 1,2-dihydro-2-oxo - 4 - pyrrolidinopyrimido[4,5-b]quinoxaline-5,10-dioxide.

8. The compound according to claim 1 which is 1,2-dihydro-2-oxo - 4 - morpholinopyrimido[4,5-b]quinoxaline-5,10-dioxide.

9. The compound according to claim 1 which is 1,2-dihydro-2-oxo - 4 - hexamethyleniminopyrimido[4,5-b]quinoxaline-5,10-dioxide.

10. The process for the preparation of a compound selected from the group consisting of a 1,2-dihydro-2-oxo-4-aminopyrimido [4,5-b]quinoxaline-5,10-dioxide of the formula:

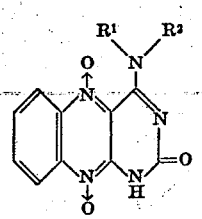

wherein each of $R^1$ and $R^2$ independent of the other is lower alkyl of 1 to 6 carbon atoms or (lower alkoxy) lower alkyl in which "lower alkyl" contains 1 to 6 carbon atoms and "lower alkoxy" contains 1 to 6 carbon atoms or $R^1$ and $R^2$ together with the nitrogen atom to which they are attached are pyrrolidino, piperidino, hexamethyleneimino or morpholino; and a pharmaceutically acceptable acid addition salt thereof which comprises treating an amidine of the formula:

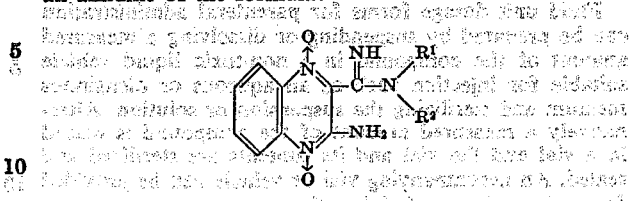

wherein $R^1$ and $R^2$ are as herein defined with phosgene or lower alkyl chloroformate at a temperature of from about 20° to about 100° C. in an inert organic solvent and treating the product thereby formed with an organic amine or inorganic base selected from the group consisting of a hydroxide, carbonate and bicarbonate of an alkali metal or alkaline earth metal.

References Cited
UNITED STATES PATENTS
3,214,425   10/1965   Rowan et al. _____ 260—211.3

NICHOLAS S. RIZZO, Primary Examiner
R. V. RUSH, Assistant Examiner

U.S. Cl. X.R.
260—250 R, 251.5; 424—248, 251